(No Model.)

W. H. NICHOLSON.
SHAFT COUPLING.

No. 565,088. Patented Aug. 4, 1896.

Witnesses

Inventor
Wm. H. Nicholson.
By Attorney Herbert W. T. Jenner.

UNITED STATES PATENT OFFICE.

WILLIAM H. NICHOLSON, OF WILKES-BARRÉ, PENNSYLVANIA.

SHAFT-COUPLING.

SPECIFICATION forming part of Letters Patent No. 565,088, dated August 4, 1896.

Application filed April 9, 1895. Serial No. 545,059. (No model.)

*To all whom it may concern:*

Be it known that I, WILLIAM H. NICHOLSON, a citizen of the United States, residing at Wilkes-Barré, in the county of Luzerne and State of Pennsylvania, have invented certain new and useful Improvements in Shaft-Couplings; and I do hereby declare the following to be a full, clear, and exact description of the invention, such as will enable others skilled in the art to which it appertains to make and use the same.

This invention relates to shaft-couplings; and it consists in the novel construction and combination of the parts hereinafter fully described and claimed.

Figure 1:
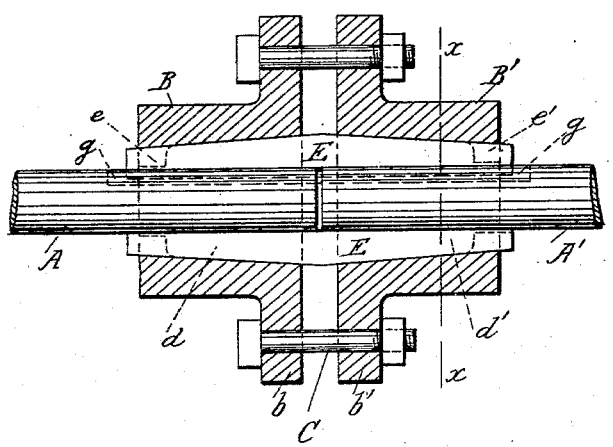
Figure 2:
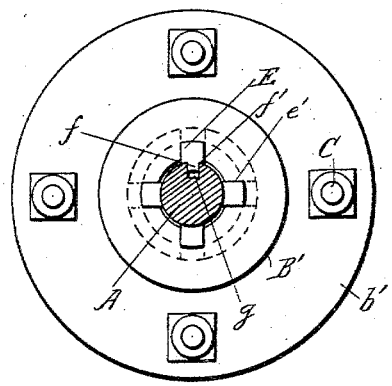
Figure 3:
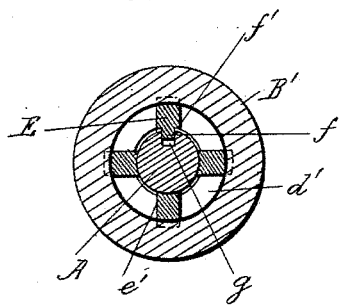

In the drawings, Figure 1 is a longitudinal section through the coupling. Fig. 2 is an end view of the coupling. Fig. 3 is a cross-section taken on the line $x\ x$ in Fig. 1.

A A' are the adjacent ends of two shafts. The coupling consists of two similar hubs B B', provided with flanges $b\ b'$, and C are bolts which pass through the said flanges and secure them together and to the ends of the shaft. The hubs B B' are provided with tapered chambers $d\ d'$ and have slots $e\ e'$ at their smaller ends.

E are double-tapered keys arranged in the said slots $e\ e'$ longitudinally of the coupling and at equal distances apart. When the bolts C are tightened up, the keys are clamped against the peripheries of the ends of the shafts and hold the shafts concentric and coupled together.

In order to insure against accidental slip when sudden strains are thrown on the coupling, one of the keys E is provided with a longitudinal projection $f$ on its concave surface, which bears against the peripheries of the shafts. This projection is narrower than the key, and the shoulders $f'$ on each side of the projection bear against the shafts and perform their part in coupling them and holding them concentric.

The end portions of the shafts are provided with keyways $g$ of the same width as the projection $f$, but deeper than the said projection. The projection engages with the keyways and insures the coupling against slip when sudden strains come upon it without otherwise affecting the action of the parts.

The central portion of the projection $f$ and the key which carries it is subjected to a shearing strain at the point where the ends of the two shafts abut against each other, and the shafts cannot slip without first shearing through the said projection and key.

What I claim is—

1. In a shaft-coupling, the combination, with the end portions of two shafts each provided with a similar keyway, of a double-tapered friction-key provided with a projection $f$ on its under side engaging with both the said keyways and subjected to shearing strain at the point where the shafts abut, similar double-tapered friction-keys bearing on the said shafts at points equidistant from the first said friction-key, and means for tightening all the said keys simultaneously and thereby holding the two shafts concentric, substantially as set forth.

2. In a shaft-coupling, the combination, with the ends of two shafts provided with similar keyways; of two hubs provided with similar tapered chambers having a series of narrow slots in their smaller ends; double-tapered keys inserted in the said slots and chambers, one of the said keys being provided with a projection extending longitudinally from one end of the key to the other and fitting sidewise in the keyways of both shafts without touching their bottoms; and clamping-bolts operating to draw together the said hubs thereby coupling the said shafts together, substantially as set forth.

In testimony whereof I affix my signature in presence of two witnesses.

WILLIAM H. NICHOLSON.

Witnesses:
S. T. NICHOLSON,
WILLIAM NICHOLSON, Jr.